(12) United States Patent
Kohlndorfer et al.

(10) Patent No.: US 9,469,272 B2
(45) Date of Patent: Oct. 18, 2016

(54) LOAD LIMITING SEAT BELT RETRACTOR WITH SPIRAL TURN LIMITER

(71) Applicant: Autoliv ASP, Inc., Ogden, UT (US)

(72) Inventors: Kenneth Kohlndorfer, Roseville, MI (US); Kurt Schulz, Romeo, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 154 days.

(21) Appl. No.: 14/199,024

(22) Filed: Mar. 6, 2014

(65) Prior Publication Data

US 2015/0251627 A1 Sep. 10, 2015

Related U.S. Application Data

(60) Provisional application No. 61/788,511, filed on Mar. 15, 2013.

(51) Int. Cl.
*B60R 22/34* (2006.01)
*B60R 22/28* (2006.01)

(52) U.S. Cl.
CPC ...... *B60R 22/3413* (2013.01); *B60R 2022/286* (2013.01)

(58) Field of Classification Search
USPC ..................................................... 242/379.1
See application file for complete search history.

(56) References Cited

U.S. PATENT DOCUMENTS

| | | | |
|---|---|---|---|
| 3,881,667 A * | 5/1975 | Tandetzke | B60R 22/3413 242/379.1 |
| 5,344,095 A | 9/1994 | Frei | |
| 5,522,564 A | 6/1996 | Schmidt et al. | |
| 5,526,996 A | 6/1996 | Ebner et al. | |
| 5,547,143 A | 8/1996 | Miller, III et al. | |
| 5,732,974 A | 3/1998 | Sayles | |
| 5,820,058 A | 10/1998 | Hirzel et al. | |
| 5,823,627 A | 10/1998 | Viano et al. | |
| 5,881,962 A | 3/1999 | Schmidt et al. | |
| 5,899,402 A | 5/1999 | Koning | |
| 5,924,640 A | 7/1999 | Hickey | |
| 5,938,135 A | 8/1999 | Sasaki et al. | |
| 6,012,667 A | 1/2000 | Clancy, III et al. | |
| 6,029,924 A | 2/2000 | Ono et al. | |

(Continued)

FOREIGN PATENT DOCUMENTS

| DE | 19681341 C1 | 4/1995 |
|---|---|---|
| DE | 4322798 A1 | 9/2000 |

(Continued)

*Primary Examiner* — Emmanuel M Marcelo
*Assistant Examiner* — Justin Stefanon
(74) *Attorney, Agent, or Firm* — Brinks Gilson & Lione

(57) ABSTRACT

A motor vehicle seat belt retractor having load limiting features for controlling seat belt restraint loads for a retractor having a spool for storing belt webbing and rotatable with respect to a retractor frame, and a locking mechanism for locking the spool to provide vehicle occupant restraint. A load limiting element coupled with the spool limits restraint loading of the seat belt webbing upon locking of the spool. A rotational displacement limiting mechanism limits the displacement of the load limiting element, the limiting mechanism having a cam forming a spiral flight rotatable with the load limiting element and a cam follower engaging the spiral flight. The cam and the cam follower interengage to reach an end position preventing further relative angular displacement beyond a predetermined angular displacement of the load limiting element. Embodiments provide various configurations for the cam and cam follower elements.

27 Claims, 6 Drawing Sheets

(56) References Cited

U.S. PATENT DOCUMENTS

| | | | |
|---|---|---|---|
| 6,105,893 A | 8/2000 | Schmidt et al. | |
| 6,105,894 A | 8/2000 | Singer et al. | |
| 6,151,540 A | 11/2000 | Anishetty | |
| 6,241,172 B1 | 6/2001 | Fugel et al. | |
| 6,267,314 B1 | 7/2001 | Singer et al. | |
| 6,340,176 B1 | 1/2002 | Webber et al. | |
| 6,363,722 B1 | 4/2002 | Takehara et al. | |
| 6,364,238 B1 | 4/2002 | Weller | |
| 6,502,860 B1 | 1/2003 | Siegfried et al. | |
| 6,520,540 B1 | 2/2003 | Siegfried et al. | |
| 6,554,318 B2 | 4/2003 | Kohut et al. | |
| 6,568,621 B2 * | 5/2003 | Hiramatsu | B60R 22/4676 242/379.1 |
| 6,572,147 B2 | 6/2003 | Webber et al. | |
| 6,578,786 B2 * | 6/2003 | Kajiyama | B60R 22/4676 242/379.1 |
| 6,592,064 B2 | 7/2003 | Clute et al. | |
| 6,605,877 B1 | 8/2003 | Patterson et al. | |
| 6,616,081 B1 | 9/2003 | Clute et al. | |
| 6,641,075 B2 * | 11/2003 | Specht | B60R 22/4676 242/374 |
| 6,722,600 B2 | 4/2004 | Hamaue et al. | |
| 6,729,649 B1 | 5/2004 | Schmidt | |
| 6,848,644 B2 * | 2/2005 | Eberle | B60R 22/44 242/374 |
| 7,124,974 B2 | 10/2006 | Shiotani et al. | |
| 7,318,560 B2 | 1/2008 | Clute | |
| 7,318,607 B2 | 1/2008 | Clute | |
| 7,429,012 B2 | 9/2008 | Löffler et al. | |
| 7,954,854 B2 * | 6/2011 | Keller | B60R 22/4676 242/379.1 |
| 8,262,133 B2 * | 9/2012 | Usoro | B60R 22/4676 242/381 |
| 2001/0006204 A1 * | 7/2001 | Kajiyama | B60R 22/4676 242/379.1 |
| 2002/0060261 A1 | 5/2002 | Kameyoshi et al. | |
| 2004/0227030 A1 * | 11/2004 | Nagata | B60R 22/4633 242/374 |
| 2005/0178870 A1 | 8/2005 | Loffler et al. | |
| 2010/0176236 A1 * | 7/2010 | Clute | B60R 22/3413 242/394 |

FOREIGN PATENT DOCUMENTS

| | | |
|---|---|---|
| DE | 20015402 U1 | 2/2001 |
| DE | 19927427 A1 | 4/2001 |
| DE | 10122910 A1 | 5/2001 |
| DE | 10141915 C1 | 8/2001 |
| DE | 10025031 A1 | 11/2001 |
| DE | 10059227 C1 | 3/2002 |
| DE | 10234708 A1 | 2/2003 |
| DE | 10204477 A1 | 8/2003 |
| DE | 103 39 563 A1 | 4/2005 |
| DE | 10 2006 043 780 A1 | 8/2007 |
| EP | 0 627 345 A1 | 4/1994 |
| EP | 0 856 443 A1 | 8/1998 |
| EP | 0940307 A2 | 3/1999 |
| EP | 1038738 A1 | 3/2000 |
| EP | 1415872 A1 | 10/2003 |
| EP | 1 405 777 A1 | 4/2004 |
| GB | 2268678 A | 7/1993 |
| JP | 3148350 | 6/1991 |
| JP | 7-89412 | 4/1995 |
| WO | WO 03/082640 A1 | 10/2003 |
| WO | WO 2005/037617 A1 | 4/2005 |
| WO | WO 2009/045132 A1 | 4/2009 |

* cited by examiner

LOAD LIMITING SEAT BELT RETRACTOR WITH SPIRAL TURN LIMITER

CROSS REFERENCE TO RELATED APPLICATIONS

This application claims priority to U.S. Provisional Patent Application No. 61/788,511, filed Mar. 15, 2013.

FIELD OF THE INVENTION

The present invention relates generally to a seat belt restraint system for restraining an occupant of a motor vehicle, and more particularly to a seat belt retractor for such a system having a mechanism for limiting torsional deflection of a torsion bar load limiter element.

BACKGROUND OF THE INVENTION

Seat belt retractors are a standard component of motor vehicle belt restraint systems and have a spool (spindle) for receiving seat belt webbing. The spool is used to wind up and store the webbing. The spool is locked against rotation upon detection at a potential accident situation in order to restrain the occupant via the seat belt. Recently, retractors have been designed having one or more load limiting elements which are structured to allow the spool to rotate and pay out the seat belt webbing upon reaching predetermined webbing load levels between the occupant and seat belt during a restraint event. In this manner, the restraint force imposed on the occupant can be limited in a controlled manner, providing desired load limitation characteristics.

More recent enhancements in load limiters have been designed to provide multilevel load limiting capabilities. For example, higher restraining forces may be initially applied, followed by lower restraining forces at a later point during an emergency event, or a low to high load profile can be provided. Torsion bars arranged coaxially within the spool are commonly used as load limiting elements. In an impact condition, one end of the torsion bar is locked to the retractor frame while the other end is coupled with the retractor spool. The bar section between the attachment points undergoes elastic and plastic torsional deflection, enabling torsion controlled relative rotation between the spool and the retractor frame. The resulting controlled extraction of webbing during a restraint event serves to limit belt loading acting on the vehicle occupant.

One type of multi-stage load limiting retractor uses a multi-stage torsion bar or a system of torsion bars. The multi-stage torsion bar is essentially two torsion bars that are axially aligned and joined at respective ends. The appropriate stage or portion of the torsion bar may be selectively coupled to provide a secondary load limiting characteristic as desired.

Presently available torsion bar type load limiting retractors generally operate satisfactorily. The more sophisticated multilevel load limiting systems also operate in an intended manner. However, there are additional design goals and objectives desired for further improvement. One such design goal is providing a mechanism for limiting the total rotational deflection provided by a torsion bar load limiting element, enabling multiple turns of relative rotation. In addition, in an effort to accurately tailor load limiting characteristics to design criteria, sophisticated digressive and progressive load limiting profile systems have been developed. These systems enable the force load profile of the retractor to be tailored to increase (progressive) or decrease (digressive) over extraction of the webbing. Although retractors having such capabilities are known, the related systems become complex, costly, and can impose packaging size disadvantages. Further design goals include the ability to easily adapt a retractor to provide specific load limiting characteristics to a particular vehicle application along with preferably a low part count, and low cost.

BRIEF SUMMARY OF THE INVENTION

The present invention provides a seat belt retractor that incorporates mechanisms for limiting the rotational displacement of a load limiting element such as a torsion bar. The systems of the present invention further provide progressive and digressive load limiting capabilities. Several embodiments are described, each having a form of a helical or spiral cam which limits relative rotation between components of the retractors. Features may be incorporated into the cam serving to contribute to load limiting force control.

DETAILED DESCRIPTION OF THE INVENTION

Figure 1:
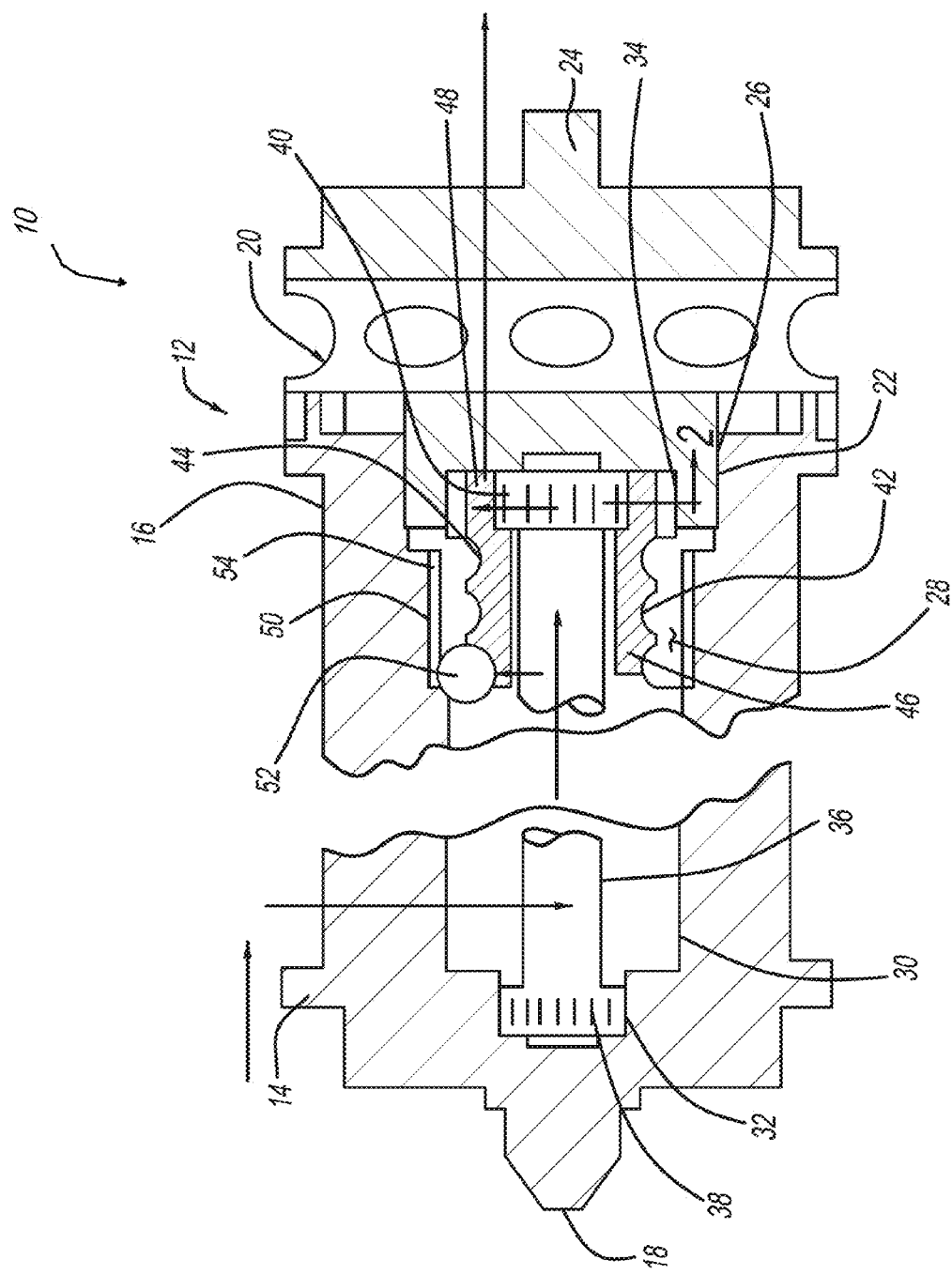
FIG. 1 is a cross-sectional view of a retractor in accordance with the first embodiment of this invention.
Figure 2:
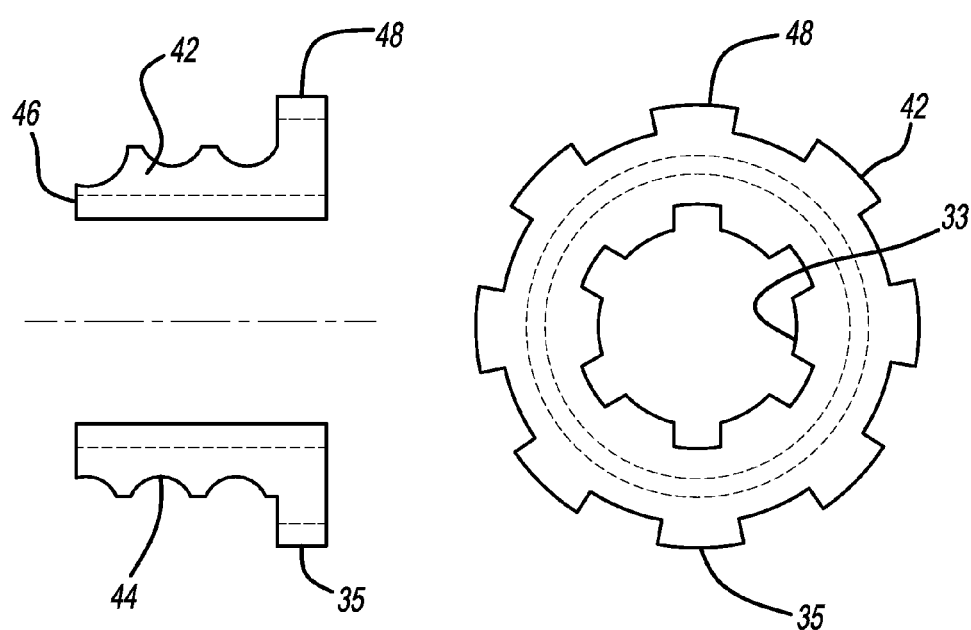
FIG. 2 is a cross-sectional view taken along line 2-2 from FIG. 1.

With particular reference to FIGS. 1 and 2, spool assembly 12 of a retractor assembly 10 in accordance with a first embodiment of this invention is illustrated. Spool assembly 12 incorporates spool element 14 which forms an outer generally cylindrical surface 16 adapted for engagement with an end of a length of seat belt webbing (not shown), and enables multiple wraps of the webbing to be rolled onto and stored on the spool element. One end of spool element 14 forms bearing stub 18 which is held within suitable bushings or bearing elements carried by a retractor frame (not shown). The opposite end of a spool element 16 abuts rotopretensioner drive pinion 20, which is provided as part of a pretensioner device incorporating a series of elements such as ball masses which are driven to engage pinion 20 under gas pressure provided by a gas generator. Rotopretensioner devices are well known and do not form a necessary component of the present invention.

Tread head 22 is also a conventional retractor component and interacts with an inertia sensitive locking system which restrains rotation of the spool element 14 upon the associated vehicle undergoing inertial loads outside prescribed limits. Upon exposure to such acceleration loads, tread head 22 becomes locked to the retractor frame, which in turn restrains rotation of spool element 14, in a manner to be described. Tread head 22 further forms a second bearing stub 24. In normal, non-emergency conditions, spool element 14 is permitted to freely rotate within the retractor frame about bearing stubs 18 and 24, with a separate torsion rewind spring (not shown) acting on the spool to provide a retracting torsion force.

A portion of tread head 22 forms a cylindrical hub 26 fit within a section 28 of central cavity 30 of spool element 14. Hub 26 is permitted, in certain conditions, to rotate relative to spool element 14. At one end of central cavity 30, spool element 14 forms splined bore 32. Tread head bearing hub 26 forms a similarly shaped splined bore 34. Torsion bar 36 is installed within spool center cavity 30, and includes a pair of heads 38 and 40 at opposite ends. Head 38 engages within bore 32 and interacts with splines of the bore to prevent relative rotation between the head and the spindle.

A drum or tubular sleeve-shaped load control coupler 42 is positioned within spool cavity 30 and forms a mounted end 48 having keyed or splined inside and outside surfaces 33 and 35, respectively, best shown in FIG. 2. Torsion bar head 40 fits within an internal splined surface 33 of coupler 42, and coupler end 48 is in turn received by splined bore 34. Torsion bar end 48, coupler 42, and spool 14 are rigidly coupled at the bar end.

During normal operation, in which the tread head 22 is not locked, spool assembly 12 is permitted to freely rotate as belt webbing is retracted and protracted from the retractor. Such retractor operation permits movement of the vehicle occupant during normal operating conditions, providing desirable comfort and convenience features. In the event that a collision condition is detected, a pretensioning device such as a rotopretensioner associated with pinion 20 may be activated by sending a firing signal to an associated gas generator. After such activation, the rotopretensioner is typically provided with a mechanism to lock pinion 20 after undergoing pretensioning rotation. In addition to such pretensioner locking, or independent of it, tread head 22 locks in response to inertial loadings acting on the vehicle, as discussed previously. In such locking conditions, tread head 22 is locked to the retractor frame and tension loads acting on the belt webbing produce a torsional load on spool element 14, which in turn transfers such load to torsion bar 36. If such restraint loads exceed predetermined levels, torsion bar 36 undergoes elastic (initially) and plastic torsional deformation. This allows controlled payout (protraction) of the belt webbing while limiting belt loads. The force flow in such conditions is illustrated by arrows in FIG. 1, which, in a restraint event, is from the seat belt webbing to spool 12, to torsion bar 36, and then grounds into the retractor frame. The characteristics of torsion bar 36 are designed to provide predetermined load limiting characteristics. Several turns of relative rotation between torsion bar heads 38 and 40 may occur. Such operation is available with current design load limiting seat belt retractors.

Spool assembly 12 provides additional features in accordance with the present invention. Load control coupler element 42 is affixed at one end to torsion bar head 40 and accordingly rotates with torsion bar head 40. The outside cylindrical surface of coupler 42 forms a helical flight 44 which forms a helical groove, much like a screw thread. Helical flight 44 is formed from free end 46 of the coupler and terminates at near the coupler mounted end 48. Spool element 14 within center cavity 30 forms an axial groove 50 extending over the axial length of coupler helical flight 44. Ball element 52 is positioned to fit within the groove 50 and helical flight 44, and acts essentially as a cam follower type element. Relative rotation between coupler 42 and spool element 14 causes ball element 52 to advance along helical flight 44 from its initial position shown in FIG. 1 to a terminal position at coupler mounted end 48 where it grounds out and can no longer move axially since it becomes buried at the coupler mounted end. By this relative movement of ball element 52, the total relative rotation between coupler 42 and spool element 14 is limited to a preset number of turns equal to the number of wraps or angular extent of helical flight 44. Relative rotation on the order of six revolutions may be provided, for example. Expressed another way, the total rotational deflection between opposing torsion bar heads 38 and 40 is likewise restricted once ball element 52 reaches its terminal position. Once a grounded out, ball element 52 directly couples tread head 22 into connection with spool element 14 and further torsional deflection of torsion bar 36 is prevented.

If desired, the force of movement of ball element 52 within helical flight 44 and groove 50 may be controlled through friction forces imposed through appropriate dimensioning of the interactive surfaces. High preloading forces (radial compression of element 5) acting on ball element 52 can imposed desirable friction acting on the ball element as it moves. Additional restriction on the movement of ball element 52, if desired, or an alternative means of imposing restriction can be provided through the addition of a deformable element 54 in the form of a metal strip, which, for example, may be positioned within spool groove 50. In such a configuration, the interaction between ball element 52, helical flight 44, and groove 50 requires deformation of element 54 upon movement of ball element along the helical flight. The interference with the movement of ball element 52 provided by element 54 represents torque acting between coupler 42 and spool element 14, which adds to the torque acting through torsion bar 36. Through appropriate design, the deformation of element 54 may be caused to increase over the displacement of ball element 52 to provide progressive load limiting, or decrease with such motion which decreases total load limiting webbing force over deflection, providing digressive load limiting features.

Additional refinements of spool assembly 12 may be implemented in connection with this invention. For example, helical flight 44 may trace more than one interlaced track, with a corresponding number of ball elements 52 being provided (i.e. multiple leading threads). The helical shape of flight 40 may feature a changing helix angle, which when interacting with deformable element 54, may provide additional load/deflection tuning opportunities. A further alternate embodiment could reverse the components forming helical flight 44, having the helical flight formed on the inside cylindrical surface of the spool cavity 30, with another groove formed by drum 42.

Figure 3:
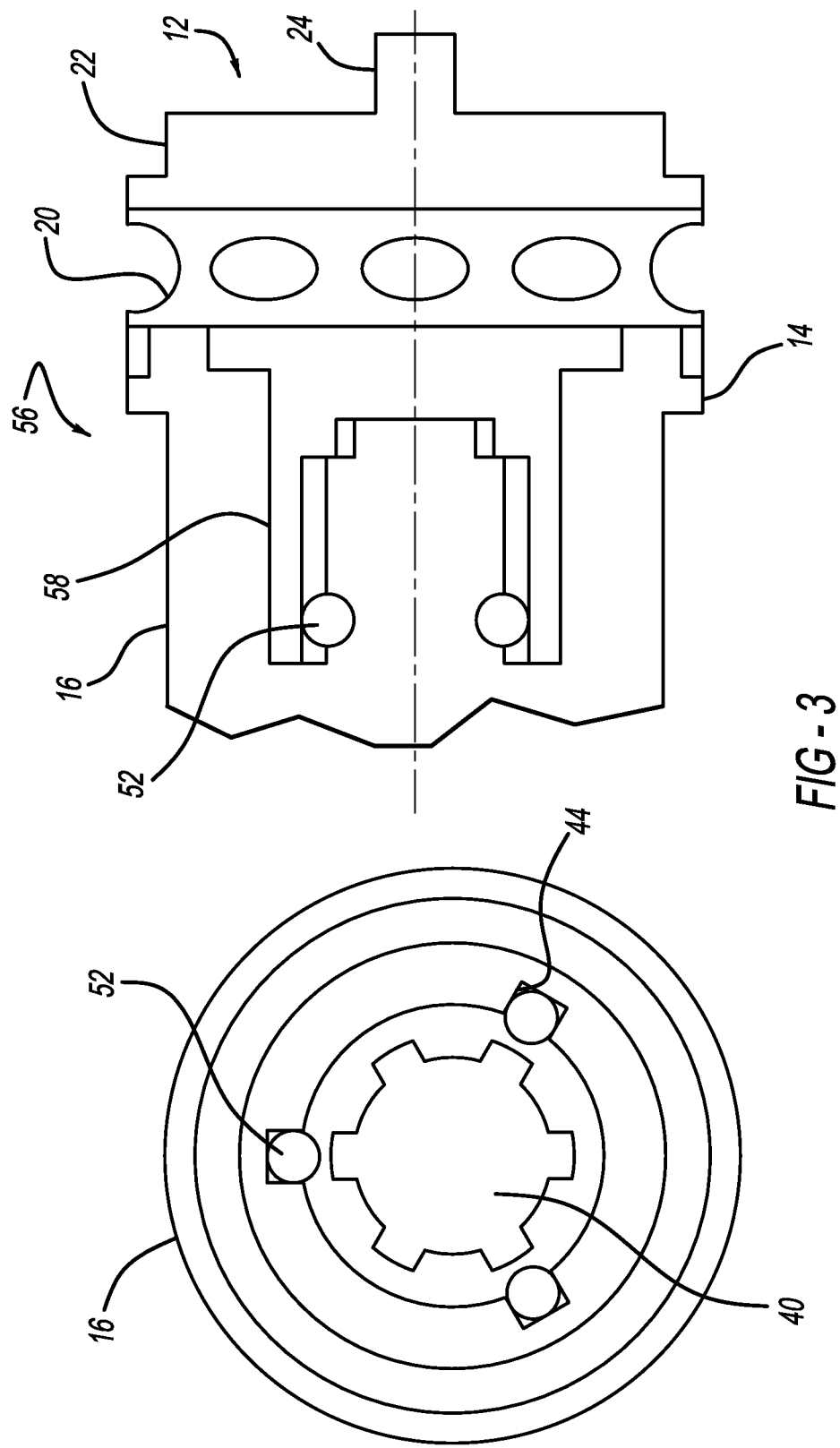
FIG. 3 is a cross-sectional view of a second embodiment of the present invention.

FIG. 3 illustrates a spool assembly 56 in accordance with a second embodiment. This embodiment differs from the first embodiment in that spiral flight 44 is formed by a tubular extension 58 of tread head 22. This figure also illustrates the provision of three ball elements 52, mentioned previously as an alternative design.

Figure 4:
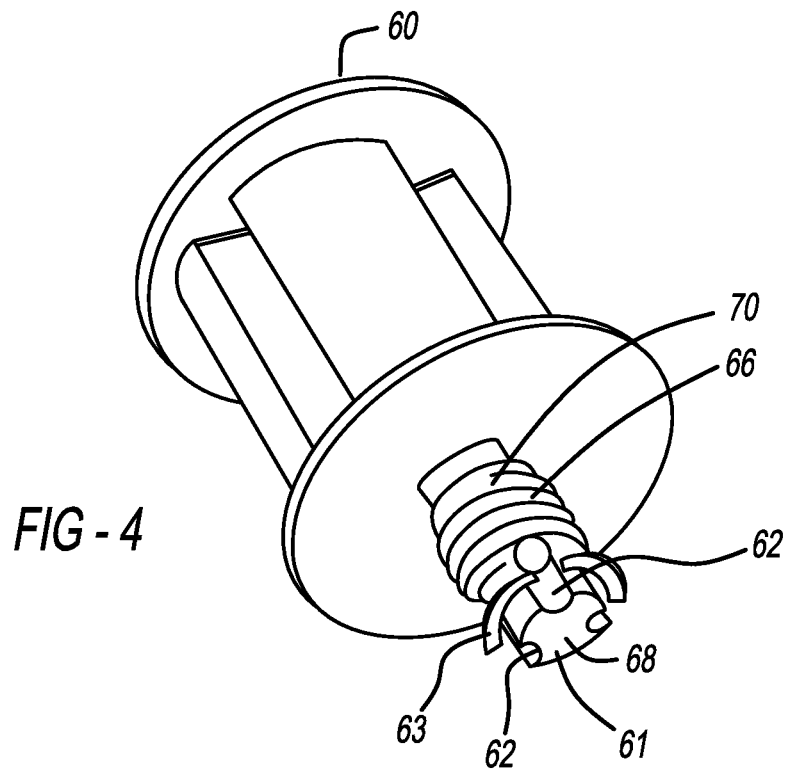
FIG. 4 is a pictorial view of a portion of a retractor spool in accordance with a third embodiment of the present invention.
Figure 5:
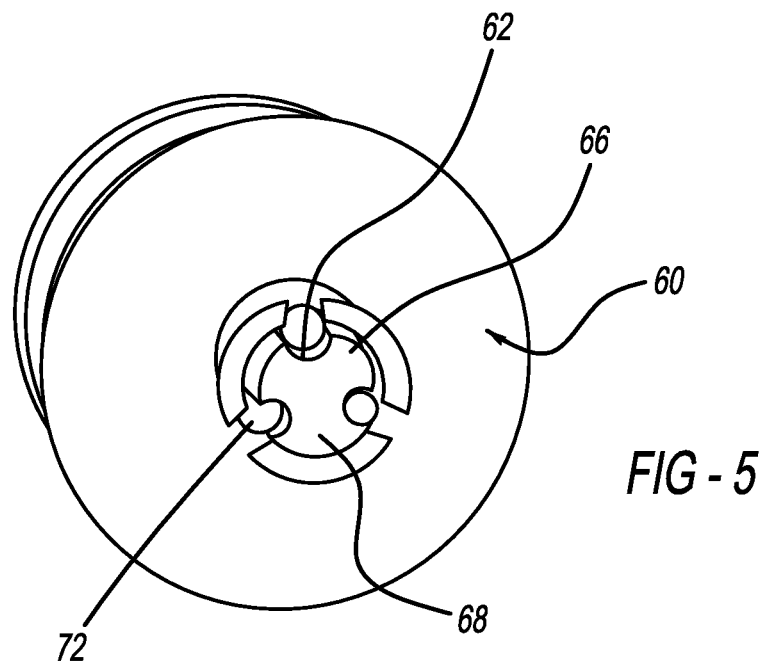
FIG. 5 is an end view of the spool shown in FIG. 4.

FIGS. 4 and 5 for illustrate spool assembly 60 in accordance with a third embodiment of the present invention. Spool assembly 60 has features with functional similarities with those discussed previously. In this case, spool assembly 60 utilizes a coupler not disposed within an internal cavity of the spool element, but rather extending from an axial end of the spool as a stub 61. Stub 61 has three axial grooves 62. Drum 63 is fixed relative to the retractor frame and forms helical flights 66. Helical flights 66 may form a single track from its outer end 68 to its inner end 70 or two, three or more tracks may be interlaced (three are shown). An appropriate number of ball elements 72 are used to interact with each of the paths of helical flight 66. Ball elements 72 interact with the helical flights 66 and grooves 62 to create an interlocking condition when the predetermined relative rotations are completed. The tread head (not shown), when locked, becomes fixed to the retractor frame (not shown). In a manner similar to the first embodiment, rotation of spool element 60 relative to the retractor frame is limited to a predetermined number of turns (full or partial) once deformation of the load limiting device occurs. In another version of spool assembly 60, stub extension 61 may form the spiral flights with an axial track formed by a fixed component surrounding the stub which both define a movement path for the ball element(s).

FIG. 5 is another view of spool assembly 60 further showing the provision of three ball elements 72 each interacting with a separate interlaced tracks of helical flight 66.

Figure 6:
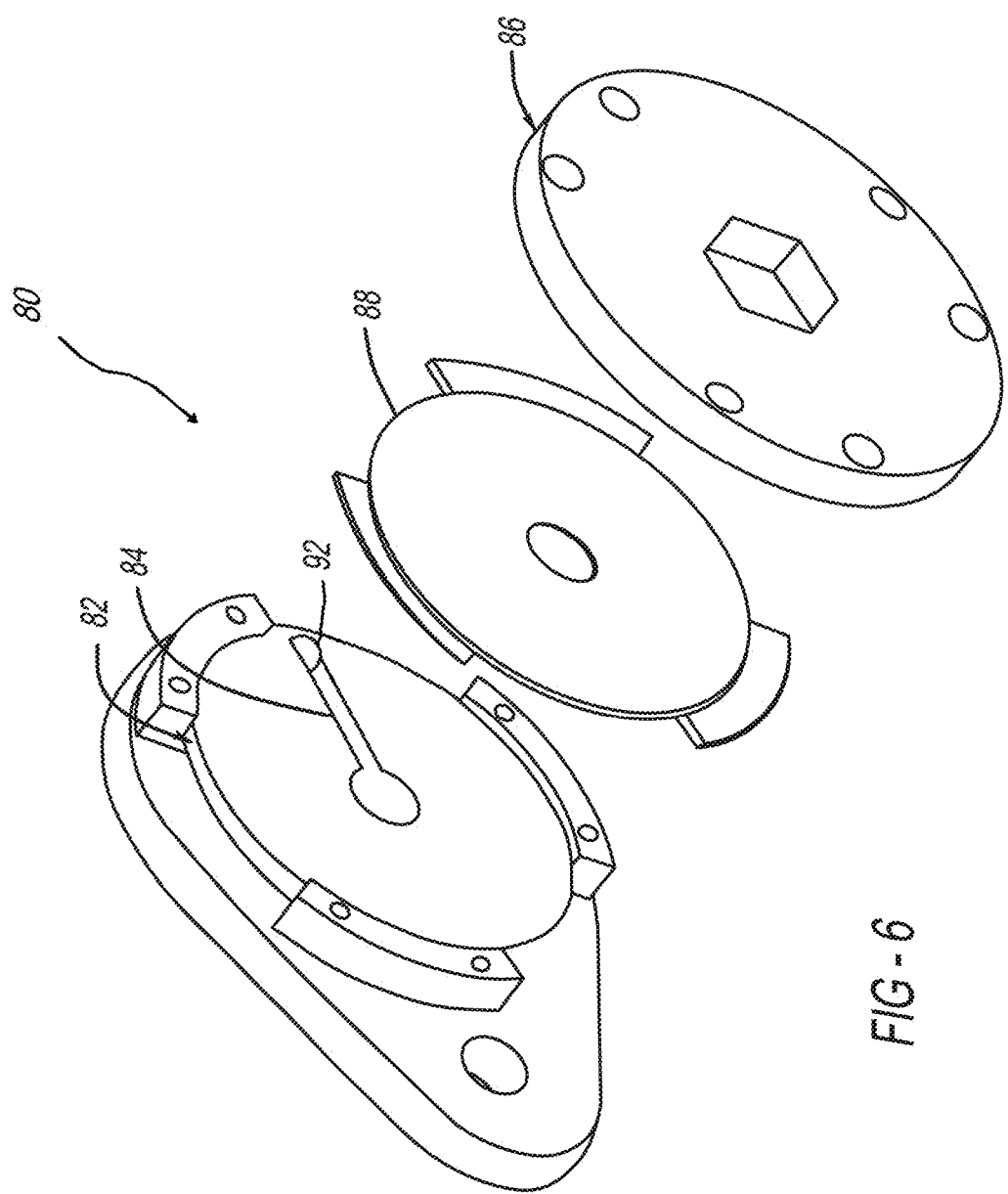
FIG. 6 is an exploded view of components of a retractor in accordance with a fourth embodiment of the present invention.
Figure 7:
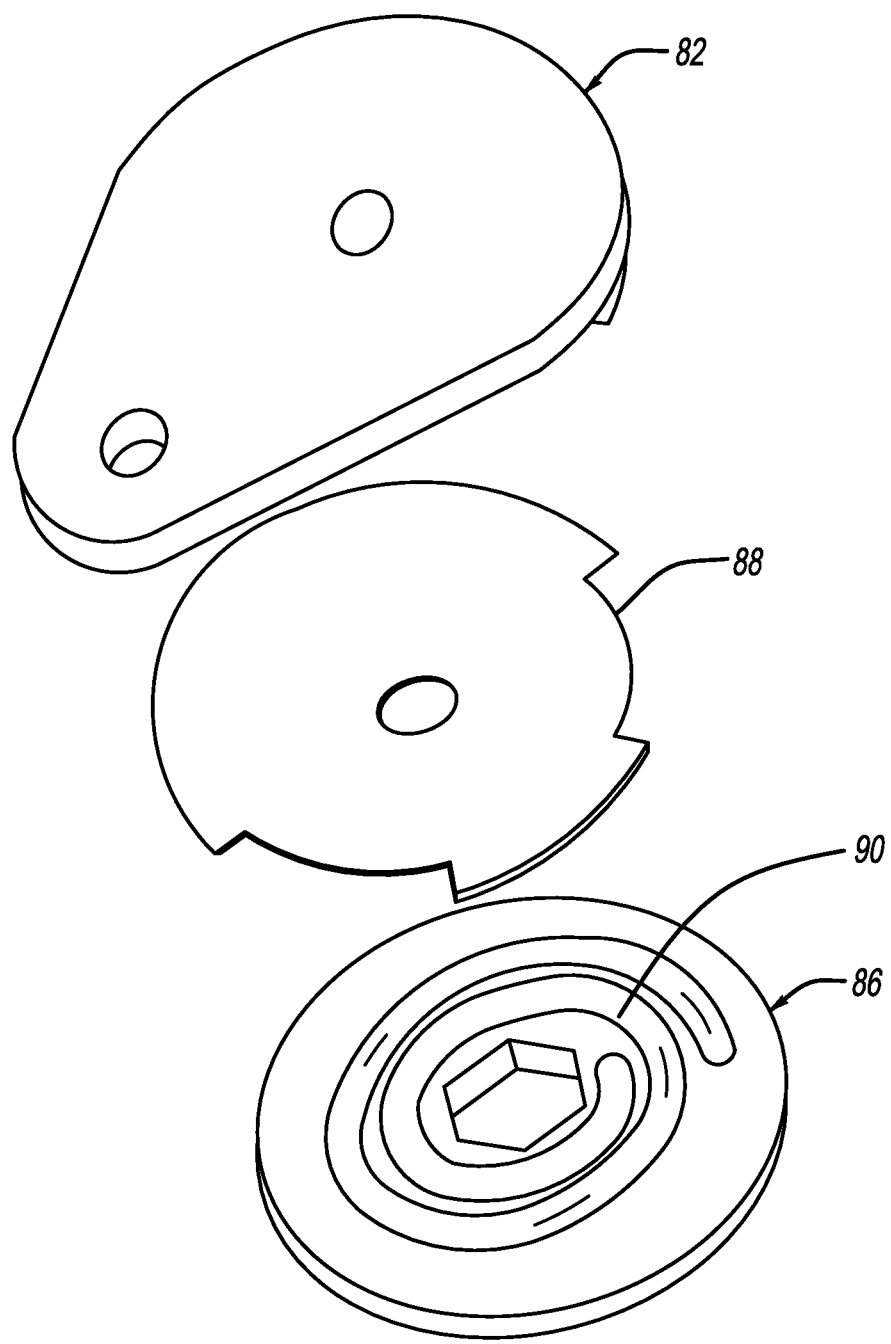
FIG. 7 is an exploded view of the components illustrated in FIG. 6 from a different perspective, showing different surfaces of the components.

Now with reference to FIGS. 6 and 7, a fourth embodiment of a spool assembly 80 in accordance with this invention is illustrated. This spool assembly features a spiral flight formation 90 on a plane. Plate element 82 forms radial track 84 extending from the center of rotation of the associated spool element (not shown) to a radially outer position. Baseplate 86 is clamped against plate 82. Deformable sheet 88, which is an optional item provided to provide additional friction or restriction to relative load limiting deflection, is sandwiched between the two plates 86 and 82.

FIG. 7 illustrates spiral flight track 90 formed on a face surface of baseplate 86. A ball element 92 shown in FIG. 6 is positioned within radial track 84 and engages with spiral flight 90. In a manner similar to the previous embodiments, ball element 92 is caused to advance along spiral flight 90 upon relative rotation between the associated spool element and its tread head. Such relative movement drives ball element 92 to move along the track of spiral flight 90 and track 84. Such movement deforms sheet 88 which, in a manner similar to the prior embodiments, imposes an additional restraint torque. Once ball element 92 reaches the terminal end of spiral flight 90, further relative rotation is prevented. The arrangement of spool assembly 80 shown in FIGS. 6 and 7 could employ ball element 92 having a starting position within spiral flight 90 at near the center of rotation of the associated spool element. Conversely, through using appropriate handedness of the spiral flight 90, the ball element 92 could begin at a radially outer position as shown in FIG. 4. In configurations of the device shown in FIGS. 6 and 7 in which deformable sheet 88 is not provided, the interacting elements provide a limited number of rotations (full or partial) during load limiting deflection.

This description of the invention refers to in the case of the first two embodiments, a helix shaped flight, and in the case of the last embodiment, a spiral shaped flight. As used herein, "spiral" is intended to encompass both formations with a plane spiral on a plate shaped element, and a helix formed on a cylindrical (or conical) surface being defined as a special case of a spiral. The components forming the spiral (or helix) flight may also be regarded broadly as a cam, with the ball elements interacting with the cam may also be described as a cam follower. Moreover, the embodiments described can be used in connection with load limiting elements beyond torsion bars. The primary features are mechanisms for limiting deflection of load limiting elements, of any type.

While the above description constitutes the preferred embodiment of the present invention, it will be appreciated that the invention is susceptible to modification, variation and change without departing from the proper scope and fair meaning of the accompanying claims.

The invention claimed is:

1. A motor vehicle seat belt retractor having load limiting features for controlling restraint load acting on seat belt webbing stored on the retractor, the retractor of a type having a spool with a first end coupled to a tread head and a second end opposite the tread head, the spool rotatable with respect to a retractor frame, the spool storing the seat belt webbing wrapped thereon, and a locking mechanism for selectively locking the spool via locking of the tread head to provide vehicle occupant restraint, the retractor comprising:
    a load limiting element having a first portion and a second portion, the second portion being rigidly coupled to the second end of the spool to prevent relative rotation between the second portion of the load limiting element and the second end of spool such that the spool rotates along with the second portion of the load limiting element when the locking mechanism is locked, the load limiting element limiting restraint loading of the seat belt webbing in response to locking of the locking mechanism, and
    a rotational displacement limiting mechanism for limiting the rotational displacement of the second portion of the load limiting element relative to the first portion of the load limiting element, the rotational displacement limiting mechanism being fixed relative to the retractor frame when the locking mechanism is locked, the rotational displacement limiting mechanism having a cam forming a spiral flight and the rotational displacement limiting mechanism further having a cam follower engaging the spiral flight, wherein, in response to the locking of the locking mechanism, the load limiting element undergoes an initial angular displacement greater than 360 degrees of the second portion relative to the first portion along with a corresponding angular displacement of the spool relative to the tread head and the retractor frame, with the cam and the cam follower interengaging such that the cam follower translates along the spiral flight from an initial position toward an end position, wherein the cam follower will reach the end position of the spiral flight preventing further relative angular displacement between the second portion of the load limiting element and the first portion of the load limiting element beyond a predetermined maximum angular displacement.

2. The motor vehicle seat belt retractor in accordance with claim 1 wherein the cam follower further engages a track coupled with the retractor.

3. The motor vehicle seat belt retractor in accordance with claim 1 wherein the load limiting element is in the form of a torsion bar.

4. The motor vehicle seat belt retractor in accordance with claim 1 wherein the spiral flight comprises two or more interlaced grooves.

5. The motor vehicle seat belt retractor in accordance with claim 1 wherein the cam is a tubular load coupler forming the spiral flight in the form of a helical profile on a surface of the tubular load coupler.

6. The motor vehicle seat belt retractor in accordance with claim 5 wherein the helical profile is formed on an outside surface of the tubular load coupler.

7. The motor vehicle seat belt retractor in accordance with claim 5 wherein the tubular load coupler is positioned inside a cylindrical cavity formed by the spool.

8. The motor vehicle seat belt retractor in accordance with claim 7 wherein the cam follower is in the form of a ball, and the spool forms a guide groove defining a channel for movement of the ball along the inside cylindrical cavity of the spool as the spiral flight rotates relative to the spool.

9. The motor vehicle seat belt retractor in accordance with claim 8 wherein the guide groove has a deformable element disposed therein which resists axial movement of the ball.

10. The motor vehicle seat belt retractor in accordance with claim 8 wherein the ball element is restricted from further movement upon reaching an end of the spiral flight thereby locking the coupler to the retractor frame.

11. The motor vehicle seat belt retractor in accordance with claim 5 wherein the tubular load coupler is positioned on an end of the spool and extending therefrom.

12. The motor vehicle seat belt retractor in accordance with claim 1 wherein the cam is in the form of a first plate having the spiral flight disposed thereon, and the cam follower is in the form of a ball element which moves along the spiral flight and radially within a groove formed by a second plate upon angular displacement of the load limiting element.

13. The motor vehicle seat belt retractor in accordance with claim 12 wherein a deformable sheet is disposed between the first plate and the second plate, the deformable sheet being deformed by the ball element as the ball element moves along the spiral flight and the groove.

14. A motor vehicle seat belt retractor having load limiting features for controlling restraint load acting on seat belt webbing stored on the retractor, the retractor of a type having a spool rotatable with respect to a retractor frame, the spool storing the seat belt webbing wrapped thereon, the retractor comprising:
  a load limiting element having a first and a second engagement sections, the first engagement section coupled with the spool to rotate with the spool and the second engagement section selectively coupled with the retractor frame via a locking mechanism in response to locking the locking mechanism, the load limiting element undergoing plastic torsional deformation of the first engagement section relative to the second engagement section thereby limiting restraint loading of the seat belt webbing in response to locking of the locking mechanism, and
  a rotational displacement limiting mechanism for limiting the maximum torsional deformation of the first engagement section of the load limiting element relative to the second engagement section of the load limiting element, the rotational displacement limiting mechanism having a cam forming a spiral flight rotatable with the load limiting element second engagement section and having a cam follower engaging the spiral flight, wherein, in response to the locking of the locking mechanism, the first engagement section of the load limiting element undergoes an initial angular displacement greater than 360 degrees relative to the second engagement section of the load limiting element, with the cam and the cam follower interengaging, the cam follower translating along the spiral flight from an initial position toward an end position and, in response to reaching the end position of the spiral flight, further relative angular displacement between the first engagement section of the load limiting element and the second engagement section of the load limiting element is prevented beyond a predetermined maximum angular displacement between the load limiting element first and second engagement sections.

15. The motor vehicle seat belt retractor in accordance with claim 14 wherein the cam follower further engages a track coupled with the retractor.

16. The motor vehicle seat belt retractor in accordance with claim 14 wherein the load limiting element is a torsion bar.

17. The motor vehicle seat belt retractor in accordance with claim 16 wherein the torsion bar is positioned inside a cylindrical cavity formed by the spool.

18. The motor vehicle seat belt retractor in accordance with claim 14 wherein the spiral flight comprises two or more interlaced grooves.

19. The motor vehicle seat belt retractor in accordance with claim 14 wherein the cam is a tubular load coupler forming the spiral flight in the form of a helical profile on a surface of the tubular load coupler.

20. The motor vehicle seat belt retractor in accordance with claim 19 wherein the load coupler is positioned on an end of the spool and extending therefrom.

21. The motor vehicle seat belt retractor in accordance with claim 14 wherein the helical profile is formed on an outside surface of the tubular load coupler.

22. The motor vehicle seat belt retractor in accordance with claim 14 wherein the cam is positioned inside a cylindrical cavity formed by the spool.

23. The motor vehicle seat belt retractor in accordance with claim 22 wherein the cam follower is in the form of a ball, and the spool forms a guide groove defining a channel for movement of the ball along the inside cylindrical cavity of the spool as the spiral flight rotates relative to the spool.

24. The motor vehicle seat belt retractor in accordance with claim 23 wherein the guide groove has a deformable element disposed therein which resists axial movement of the ball.

25. The motor vehicle seat belt retractor in accordance with claim 14 wherein the cam follower is in the form of a ball element which is restricted from further movement upon reaching an end of the spiral flight thereby locking the cam to the retractor frame.

26. The motor vehicle seat belt retractor in accordance with claim 14 wherein the cam is in the form of a first plate having the spiral flight disposed thereon, and the cam follower is in the form of a ball element which moves radially within a groove formed by a second plate upon angular displacement of the load limiting element.

27. The motor vehicle seat belt retractor in accordance with claim 26 wherein a deformable sheet is disposed between the first plate and the second plate, the deformable sheet being deformed by the ball element as the ball element moves along the spiral flight and the groove.

* * * * *